Figure 1:
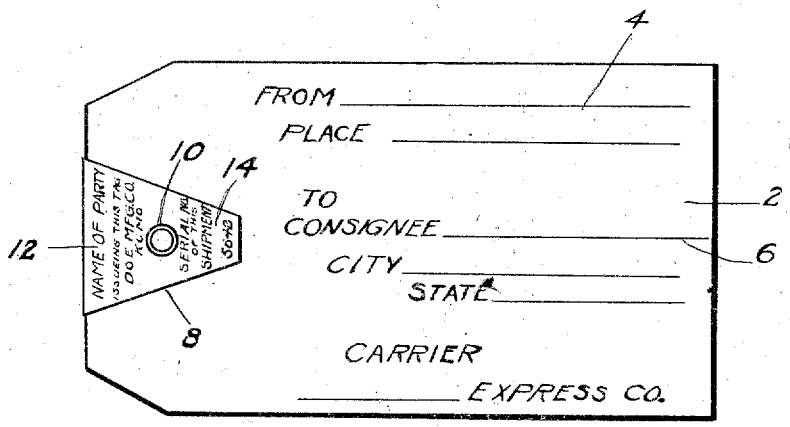
Figure 1:
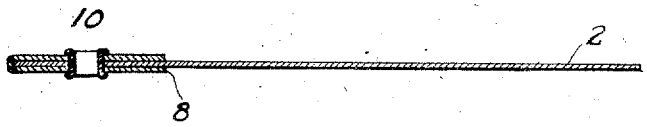

L. F. TROJA.

SHIPPING TAG.

APPLICATION FILED AUG. 20, 1919.

Reissued June 15, 1920. 14,883.

*Fig. II*

INVENTOR
Louis F. Troja
BY Arthur C. Brown
ATTORNEY

UNITED STATES PATENT OFFICE.

LOUIS F. TROJA, OF KANSAS CITY, MISSOURI, ASSIGNOR OF ONE-HALF TO GEO. R. LUDOLPH, OF KANSAS CITY, MISSOURI.

SHIPPING-TAG.

14,883. Specification of Reissued Letters Patent. Reissued June 15, 1920.

Original No. 1,246,499, dated November 13, 1917, Serial No. 175,961, filed June 20, 1917. Application for reissue filed August 20, 1919. Serial No. 318,717.

*To all whom it may concern:*

Be it known that I, LOUIS F. TROJA, a citizen of the United States, residing at Kansas City, in the county of Jackson and State of Missouri, have invented certain new and useful Improvements in Shipping-Tags; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The present invention relates to improvements in shipping tags, and aims to provide a novel type of tag with a view to eliminating much if not all of the losses and annoyance due to the mutilation and loss of shipping tags as now made and used. To this end the invention comprises a shipping tag having the usual space for the shipping address, together with suitable means for permitting attachment of the tag, in addition to which I provide a means for identifying the shipment to which the tag is attached and so embodied in the tag as not to be lost in case of mutilation or destruction of that portion of the tag which bears the shipping address. Preferably this consists in associating with the tag-securing portion of the card a reinforced area bearing marks or indicia identifying the shipper or other party issuing the card or tag for the purposes of the shipment, so that if the address portion of the tag is torn off, sufficient means for identification of the shipment will be left secured to the same, thereby enabling the carrier to secure duplicate shipping instructions without delay. It is a further object to provide a tag of the character just indicated with a further mark of identification, such as a serial mark or number, so that where the tag is issued by the carrier or by a shipper making numerous consignments, records may be kept which will enable any of these consignments to be identified by means of the indicia borne by the reinforced portions of the tags which remain attached to the consignments in question.

With these general objects in view, the invention will now be described with reference to the accompanying drawing which illustrates one form or design of tag which has been devised for embodying the proposed features of improvement, after which the same will be set forth and defined in the appended claims.

In the drawing,

Figure 1 is a plan view of a tag embodying the features of the present invention; and Fig. 2 is a sectional view of the same.

It is common knowledge that shipping tags, of the type now in use, are from numerous causes frequently torn off and lost or so completely mutilated that, unless the shipment has other means of identification, its destination becomes unknown and the shipment is delayed or perhaps delivery is never made of it, resulting in considerable annoyance and inconvenience to all concerned and often entailing great loss and misfortune. The shipping tags of the commonest type now used have eyelets or reinforced openings for the cords by which the tags are secured to the articles of shipment, and I have observed that while the principal part of the tag bearing the shipping address may become mutilated or torn entirely away, the eyelet or reinforced portion practically always remain substantially intact. If, then, this reinforced portion of the tag were so constructed as to bear a means of identification for the shipment which would always be retained in spite of the loss of the remainder of the tag, it is apparent that this would facilitate the matter by enabling the carrier to obtain the necessary information to effect proper delivery of the shipment.

Referring to the drawing in detail, the improvements are illustrated in connection with a shipping tag comprising a card 2 having the usual space, such as 4, for the name and address of the shipper, and the space 6 for filling in the name of the consignee and the destination of the shipment to which the tag is to be attached. At one end of the tag the card is reinforced, by any suitable means, such as patches of paper, fiber, or any well-known material, as 8, adapted for the purpose, and glued or otherwise secured to the card at this portion which is to be used for securing the tag to the shipment by means of cord, wire or the like (not shown) passed through the opening 10 provided in this reinforced portion, While the extent or size of this reinforced area is not material, nor the shape or design of it, it is preferably of a size sufficient to display in a distinct and legible manner the name of the firm or company or party who issues the tag or makes use of it in affixing it to the shipment; for example, as at 12, the name of the consignor of the shipment may be printed or stamped across this reinforced portion 8; or if preferred, the name of the carrier receiving the shipment may be shown instead, in case the carrier is issuing the tags and making a record of the identifying marks as hereinafter explained. In conjunction with the name of the issuing party 12, is also printed or stamped upon said reinforced portion 8 an identifying mark 14, such as a serial number, each tag being supplied with a separate number of a given series, and thereby identifying the particular shipment to which it is attached.

The tags being printed in series lots, each party issuing or making use of a given series, it will be understood that where a shipper, for example, makes use of the tags, each tag will represent and identify a separate package or consignment and the identifying number of that tag will correspond to a record entry on the books of the shipper, by reference to which he may at any time ascertain the character of the shipment and to what point it was consigned. On the other hand, the carrier, for example an express company, may adopt the use of the tags and supply them to its patrons, in which event the identifying numbers of the tags may be made to correspond to like numbers on the receipts issued for the consignments; and by reference to the copies of these receipts the company may, in like manner, ascertain all the facts relating thereto. It is obvious, therefore, that in the event of any shipping tag, embodying the present improvements, becoming mutilated or lost, the reinforced attaching portion which is left attached to the shipment, will in all cases afford a clue to the carrier for ascertaining, either from the records of the original carrier receiving the shipment (if that carrier furnished the tags), or by inquiry from the shipper if the latter retains the record, all information necessary for enabling the carrier to forward the shipment to its proper destination.

It is thus apparent that a simple and effective means is provided for carrying out the desired objects of the invention. The improved tag may be manufactured with practically no more expense than is required for making the eyelet-tag which is in common use, and yet all the difficulties arising from the constant loss of the present tags are substantially eliminated by virtue of the features embraced in tags that are made in accordance with this invention.

What I claim and desire to secure by Letters-Patent is:

1. A shipping tag comprising a card having a space for the name and address of a consignee, said card being provided with reinforcing material at its tag-attaching portion, the exposed face of said reinforcing material being marked with indicia identifying the shipment to which the tag is to be attached.

2. A shipping tag comprising a card having a space for the name and address of the consignee, said card having its tag-attaching portion provided with reinforcing material, the exposed face of said reinforcing material being marked with indicia identifying the party issuing the tag.

3. A shipping tag comprising a card having a space for the name and address of the consignee, said card having its tag-attaching portion provided with reinforcing material, the exposed face of said reinforcing material being marked with indicia identifying the party issuing the tag and also the shipment to which the tag is to be attached.

In witness whereof I hereto affix my signature.

LOUIS F. TROJA.